# 3,118,852
COMPOSITIONS COMPRISING A CARBOXYLIC ACID AMIDE INTERPOLYMER AND A HYDROXYL-CONTAINING POLYMER

Roger M. Christenson, Gibsonia, Pa., and Fred S. Shahade, Milwaukee, Wis., assignors to Pittsburgh Plate Glass Company, Pittsburgh, Pa., a corporation of Pennsylvania
No Drawing. Filed June 28, 1960, Ser. No. 39,208
11 Claims. (Cl. 260—45.2)

This invention relates to resinous compositions having many useful properties, and pertains more particularly to resinous blends of (1) an aldehyde-modified unsaturated carboxylic acid amide interpolymer, and (2) a hydroxyl-containing polymer.

In a copending application, Serial No. 749,583, filed July 21, 1958, now U.S. Patent No. 3,037,963, there is disclosed a process for producing useful resinous products from unsaturated carboxylic acid amides such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde in the presence of an alcohol such as butanol. The resulting resins range from soft, flexible materials to very hard solids, depending upon the choice of monomers utilized in preparing the amide interpolymer which in turn is reacted with the aldehyde and the alcohol.

The resins prepared in accordance with the method described in said copending application, Serial No. 749,583, are water-insoluble interpolymers useful in coating compositions, laminates, and the like, particularly when blended with one or more other resinous materials such as epoxide resins, vinyl resins, amine resins, alkyd resins, nitrocellulose, polyethylene, and the like. Such resinous blends form films with excellent flexibility, recoat adhesion, and freedom from undesirable color formation, even on overbaking of the film. These films are also outstanding in appearance, gloss, adhesion, mar resistance, color retention, moisture resistance, stain resistance, grease resistance, heat resistance, detergent resistance and corrosion resistance. Moreover, these outstanding properties are obtained in a single coating of the resinous coating composition on a metallic surface, whereas previous coating compositions have almost without exception required the use of one or more so-called "primer" coats.

The outstanding properties set forth in the foregoing paragraph render the aldehyde-modified amide interpolymer coating compositions useful as finishes for appliances, such as ranges, refrigerators, air conditioners, washers, water heaters, as well as finishes for steel building panels and aluminum siding, and in fact as general industrial finishes on solid surfaces, such as metals, plastics, wallboard, and the like. Such compositions have met with wide commercial acceptance throughout the world.

However, the aldehyde-modified amide interpolymer resins and blends thereof with other resinous materials possess one disadvantage in that coating compositions prepared therefrom should be cured at temperatures of about 350° F. for a period of 30 minutes in order that the outstanding properties set forth hereinabove for such materials will be obtained to the optimum degree. Many industrial finishing installations do not possess oven facilities which can attain temperatures as high as 350° F. Consequently, industries having oven facilities which cannot be operated at temperatures as high as 350° F. have not been able to obtain optimum properties from coating compositions containing the aldehyde-modified amide interpolymer resins.

It has now been discovered that the curing temperature of such aldehyde-modified amide interpolymers at which optimum film properties are obtained can be substantially lowered, for example, to as low as about 300° F., and in some instances as low as 250° F. This desirable result is obtained by blending with the aldehyde-modified amide interpolymer resin (alone or in admixture with another resin such as an epoxide resin or vinyl resin) a polymer of an aliphatic unsaturated alcohol. By blending only a relatively small quantity of such polymer with the aldehyde-modified amide interpolymer resin, the temperature at which complete cure of the resin is obtained is decreased, as indicated hereinabove, to temperatures as low as 250° F., or 300° F. (for a 30 minute period). More importantly, however, this decrease in cure temperature is obtained in most instances with no sacrifice in the outstanding properties which such aldehyde-modified amide interpolymer resins impart to coating compositions. In fact, in most instances, some of the film properties are actually improved, notwithstanding the lower baking temperatures.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

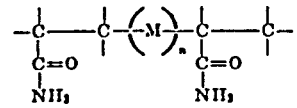

wherein M represents a unit of a monomer polymerizable with acrylamide, and n represents a whole number greater than 1. For example, if styrene is utilized as the second monomer, M represents the unit

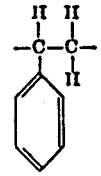

The relatively short chain interpolymer then reacts with an aldehyde, as represented by formaldehyde, to give the structure

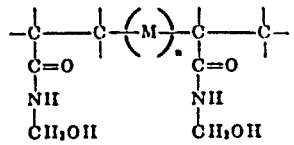

wherein M and n have the significance set forth hereinabove.

In the event the aldehyde is utilized in the form of a solution in butanol or other alkanol, etherification will take place so that at least some of the methylol groups in the above structure will be converted to groups of the structure

—$ROR_1$ wherein R is a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol such as methanol, ethanol, propanol, pentanol, octanol, decanol and other alkanols containing up to about 20 carbon atoms may also be employed as may aromatic alcohols such as benzyl alcohol or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl-propene-1), 2-methyl-propene-1, 2-methyl-butene-1, 2-methyl-pentene-1, 2,3 - dimethyl - butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl - pentene - 1, 2,3,4-trimethyl-pentene-1, 2,4,4-trimethyl - pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4 - dichlorostyrene, 3,4 - difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2 - chlorohexene, 2-chloroheptene, 2-bromobutene, 2-bromoheptene, 2-fluorohexene, 2-fluorobutene, 2-iodopropene 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodidethylene, chloroethylene (vinyl chloride), 1,1-dichloroethylene (vinylidene chloride), bromoethylene, fluoroethylene, iodoethylene, 1,1-dibromoethylene 1,1-fluoroethylene, 1-1-diiodoethylene, 1,1,2,2-tetrafluoroethylene, 1,1,2,2-tetrachloroethylene, 1,1-chloro-2,2,2-trifluoroethylene, chlorobutadiene and other halogenated diolefinic compounds;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl-m-chlorobenzoate and similar vinyl halobenzoates, vinyl-p-methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, ispropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohols, beta-propyl allyl alcohols, 1-buten-4-ol, 2-methyl-buten-ol-4, 2(2,2-dimethylpropyl)-1-buten-4-ol and 1-pentene-4-ol;

Methyl alpha-chloroacrylate, methyl alpha-bromo-acrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles such as acrylonitrile, methacrylonitrile, ethacrylonitrile, 3-octenenitrile, crotonitrile, oleonitrile, and the like;

(5) Acid monomers such as acrylic acid, methacrylic acid, crotonic acid, 3-butenoic acid, angelic acid, tiglic acid, and the like.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosures of which are incorporated herein by reference.

As disclosed hereinabove, the amide interpolymer resin prepared according to the disclosures in the above-identified patents is reacted with an aldehyde, preferably in the presence of an alcohol. Formaldehyde, in solution in water (formalin), or in an alkanol such as butanol, or a formaldehyde-yielding substance such as para-formaldehyde, trioxymethylene, or hexamethylenetetramine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst such as maleic anhydride. Other acid catalysts such as oxalic acid, hydrochloric acid, or sulfuric acid may also be employed, although there is some possibility of gelation occurring if the acid catalyst is too strongly acidic. Alkaline catalysts such as sodium hydroxide, potassium hydroxide, hexamethylene tetramine, and other basic amines may also be utilized. The quantity of catalyst utilized may be varied widely; for example, amounts as low as 0.05 percent by weight to as high as 2.0 percent by weight or even higher can be utilized with good results.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture until the desired viscosity is obtained, ordinarily about 3 to 5 hours. The water of condensation can be removed by azeotropic distillation as may a portion of the solvent if desired. In fact, when the aldehyde is utilized in the form of a solution in an alkanol such as butanol, it is desirable that approximately half of the butanol be distilled off at the end of the reaction period and replaced by another solvent such as xylene. It is preferred that the final resinous material have a solids content of about 20 percent to 70 percent.

Similar polymeric materials may also be obtained by first reacting the amide with an aldehyde such as formaldehyde to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application, Serial No. 775,380, filed November 21, 1958, now U.S. Patent No. 3,079,434, does not require reaction of the polymer with an aldehyde since the N-alkoxyalkyl amide monomers already contain —ROH or —ROR$_1$ groups, wherein R and R$_1$ have the meanings set forth above.

Regardless of the method by which the resinous material is obtained, it will contain in the polymer chain recurrent groups of the structure

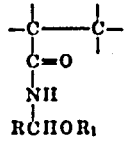

wherein R is hydrogen or a lower aliphatic hydrocarbon radical, and R$_1$ is hydrogen or the radical derived by removing the hydroxyl group from an alcohol. Thus, when the reaction is carried out in the presence of an alcohol, the alcohol reacts so that at least some, and preferably more than about 50 percent of the radicals R$_1$ will represent the radical derived from the alcohol. When the aldehyde is utilized alone, that is, not in an alcohol solution, the radical R$_1$, of course, will represent hydrogen. The free valences in the above structure may be satisfied with either hydrogen or hydrocarbon depending upon the amide which is utilized in the interpolymerization reaction.

As indicated hereinabove, the present invention relates to blends or mixtures of such aldehyde-modified amide interpolymer resins with a polymer of an aliphatic unsaturated alcohol. The term "polymer" as utilized herein in connection with the aliphatic unsaturated alcohol is intended to cover not only homopolymers of such alcohols, but also copolymers of such alcohols with another monomer containing a $CH_2=C<$ group, and interpolymers of such alcohols with two or more $CH_2=C<$ monomers.

The preferred polymers for blending the aldehyde-modified amide interpolymer resins in accordance with this invention are polymers of an unsaturated primary aliphatic alcohol with at least one monomer containing a $CH_2=C<$ group. One particularly useful product of this type is a polymer of allyl alcohol and styrene having the following structure

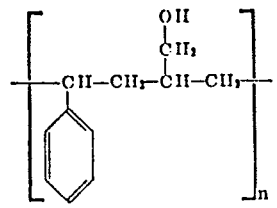

Preferably, the value of $n$ is in the range of about 4 to 10, and several products of this general class are available commercially. In the preparation of such polymers, the allyl alcohols can be replaced by other alcohols containing a polymerizable $CH_2=C<$ group, for example, methallyl alcohol, allyl carbinol, beta-allyl-ethyl alcohol, methyl-vinyl carbinol, vinyl-ethyl carbinol, methyl-allyl carbinol, and the like, with aliphatic unsaturated alcohols containing up to about 10 carbon atoms being particularly valuable.

As already indicated, homopolymers of the above alcohols and others, for example, polyallyl alcohols, can be utilized to reduce the curing temperature of aldehyde-modified amide interpolymer resins. When it is desired to utilize a copolymer or interpolymer of such alcohols with other ethylenically unsaturated monomers, such monomers can be selected from the group of polymerizable monomers set forth hereinabove, with styrene and acrylonitrile being particularly preferred. Another route to this same type of polymer is through the hydrogenation of acrolein polymers.

In blending or admixing the polymer of the aliphatic unsaturated alcohol with the aldehyde-modified amide interpolymer resin, it is ordinarily preferred that the polymer of the alcohol be employed in an amount of about 10 percent to 25 percent by weight on a resin solids basis in order that optimum properties are obtained. However, it is also possible to utilize amounts of the polymer as small as about 2 percent by weight on a resin solids basis, or as high as about 50 percent by weight or even higher with good results.

While useful properties are obtained when the polymer of the unsaturated alcohol is blended with the aldehyde-modified amide interpolymer resin as the sole resinous component in the composition, substantially better results are obtained when one or more other resins are included in the mixture or blend. The preferred resin for this use is an epoxide resin, that is, a resin containing at least one group of the structure

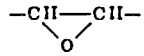

The preferred epoxide resins for blending with the polymer of the unsaturated alcohol and the aldehyde-modified amide interpolymer resin are the polyglycidyl ethers of polyhydric compounds, particularly the polyglycidyl ethers of bisphenolic compounds. Epoxide resins of this type are disclosed in U.S. Patent 2,870,117 referred to hereinabove. Preferably, the epoxide resin utilized possesses a molecular weight above about 200, and those epoxide resins having a molecular weight in the range of about 700 to 1200 are particularly suitable for use in the compositions of this invention. Ordinarily, the epoxide resin is utilized in an amount as low as about 5 percent by weight to about 40 percent or more by weight based on the solids content of the aldehyde-modified amide interpolymer resin.

In addition to the epoxide resins, other resins which may be utilized in combination with the polymer of the unsaturated alcohol and the aldehyde-modified amide interpolymer resin include the vinyl resins, particularly polymers of vinyl halides such as vinyl chloride, the alkyd resins, both oil modified and non-oil modified, epoxidized oils, that is, esters of the epoxy fatty acids, preferably containing at least 8 carbon atoms, amine resins such as urea-formaldehyde resins and melamine-formaldehyde resins, nitrocellulose, hydrocarbon resins such as polyethylene and polypropylene, phenolic resins, silicone erization in each example was carried out by mixing the polymerizable components with a chain transfer agent (except in Example V where none was utilized) in a solvent such as butanol or a mixture of butanol and xylene, and adding a polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Di-t-butyl peroxide
C—Cumene hydroperoxide
D—Alpha-methyl styrene dimers
E—Dodecyl mercaptan
F—Tertiary dodecyl mercaptan

|  | EXAMPLE I 15% acrylamide; (A) 25% methyl methacrylate; (B) 60% ethyl acrylate | EXAMPLE II 20% acrylamide; (A) 20% methyl methacrylate; (B) 60% ethyl acrylate | EXAMPLE III 50% acrylamide; (A) 25% styrene; (B) 60% ethyl acrylate | EXAMPLE IV 20% acrylamide; (A) 40% styrene; (B) 40% butadiene | EXAMPLE V 20% acrylamide; (A) 80% vinyl toluene |
|---|---|---|---|---|---|
| Polymerization charge and procedure (pounds except where otherwise indicated): |  |  |  |  |  |
| Acrylamide | 3 | 40 | 3 | 100 | 250. |
| Monomer A | 5 | 40 | 5 | 320 | 1,000. |
| Monomer B | 12 | 120 | 12 | 320 |  |
| Catalyst | 90.8 grams C | 2A | 90.8 grams C | 16.0 B | 25.0 A |
|  |  |  | 90.8 grams A |  |  |
| Modifier | 90.8 grams F | 2D | 90.8 grams F | 8.0 E |  |
| Solvent: |  |  |  |  |  |
| Butanol | 20.0 | 200 | 20.0 | 1,200 | 1250. |
| Xylene |  |  |  | 500 |  |
| Reflux time (hours) | 4 | 4 | 6 | 16[1] | 10. |
| Polymer Properties: |  |  |  |  |  |
| Percent Solids | 52.5 | 51.0 | 51.5 | 25.1 | 49.1. |
| Viscosity (Gardner) | Z₁ | Z₁-Z₄ | Z |  |  |
| Formaldehyde condensate parts: |  |  |  |  |  |
| Butanol Solution of Formaldehyde | 6.34 | 84.6 | 6.34 | 339 | 75/351.[2] |
| Maleic Anhydride | 36.3 | 1.0 | 36.3 | 4.5 | 1.0. |
| Reflux time (hours) | 3 | 3½ | 3 | 4 | 16. |
| Final product: |  |  |  |  |  |
| Percent Solids | 50.1 | 48.95 | 50.6 | 49.4[3] | 41.3. |
| Viscosity (Gardner) | Y | Y | U-V | Z | X-Y. |
| Color (Gardner) | 3-4 | <1 | 3-4 | 3-4 | 1-2. |

[1] Bomb.   [2] Parts resin.   [3] Solids obtained by partial distillation of solvent.

resins, as well as any other resinous material compatible with the amide interpolymer resin. As is the case with the epoxide resins, these other resins may be utilized in widely varying amounts, for example, from about 5 percent or lower to about 50 percent or higher by weight, based on the resin solids content of the aldehyde-modified amide interpolymer resin.

When the resin mixtures or blends described above are utilized in forming coating compositions, pigments such as titanium dioxide, carbon black, and the like may be added to form any desired color and to enhance the film properties. Other components normally found in coating formulations, such as germicides, fillers, stabilizers, driers, anti-foaming agents, and the like may also be added.

The following examples illustrate in detail the preparation of the resinous compositions of this invention. The examples are not intended to limit the invention, however, for there are, of course, numerous possible variations and modifications.

*Examples I to V*

These examples illustrate the preparation of aldehyde-modified acrylamide interpolymers which can be blended with polymers of unsaturated aliphatic alcohols to form the coating compositions of this invention. The polym-

*Example VI*

An acrylamide interpolymer was prepared from the following components in the amounts set forth:

| | Parts by weight |
|---|---|
| Styrene | 39 |
| Ethyl acrylate | 44 |
| Acrylamide | 15 |
| Acrylic acid | 2 |
| Butanol | 100 |
| Cumene hydroperoxide | 1 |
| Tertiary dodecyl mercaptan | 1 |

The above components were admixed and refluxed for two hours after which an additional 0.5 part of cumene hydroperoxide was added and reflux continued for a further period of two hours. An additional 0.5 part of cumene hydroperoxide was added and the mixture refluxed for an additional two hours. The resultant interpolymer was then reacted with formaldehyde by adding thereto a solution comprising 0.4 mole of formaldehyde (40 percent concentration in butanol) and about 0.33 part of maleic anhydride. The resulting mixture was refluxed for three hours, after which one-half of the butanol was removed by distillation and replaced by an equal amount of xylene. The resin thus formed had the following properties:

Solids (percent) _____ 48–52.
Weight per gallon (pounds) _____ 8.2.
Viscosity (Gardner-Holdt) _____ S–X.
Color (Gardner) _____ 7 maximum.

drawn down on phosphated steel and baked at five different comparison temperatures, 250° F., 275° F., 300° F., 325° F., and 350° F. for ½ hour. The degree of cure was checked by determining the pencil hardness of the film both before and after a 5 to 10 minute soak in ethyl alcohol. The results are tabulated in the following table:

| Composition of film Forming Material | 350° F. for ½ hour pencil hardness | | 325° F. for ½ hour pencil hardness | | 300° F. for ½ hour pencil hardness | |
|---|---|---|---|---|---|---|
| | Before alcohol soak | After alcohol soak | Before alcohol soak | After alcohol soak | Before alcohol soak | After alcohol soak |
| Interpolymer of Example VI | 4H | <5B | H | <5B | F | <5B |
| Interpolymer of Example VI plus 20% by weight of styrene-allyl alcohol copolymer | 5H | F | 5H | F | 4H | <5B |

*Example VII*

Two hundred six and three-tenths (206.3) pounds of styrene, 37.5 pounds of acrylamide and 6.25 pounds of methacrylic acid were admixed with 2.5 pounds of tertiary dodecyl mercaptan (chain transfer agent), 125 pounds of butanol, 125 pounds of toluene, and 2.5 pounds of cumene hydroperoxide. The resulting mixture was refluxed for two hours after which an additional 1.25 pounds of cumene hydroperoxide was added. Refluxing was then continued for a further period of two hours at which time a final addition of 1.25 pounds of cumene hydroperoxide was made and refluxing continued until a conversion of substantially 100 percent was obtained. The resulting product was then admixed with 79.4 pounds of a 40 percent solution of formaldehyde in butanol and 1 pound of maleic anhydride catalyst. The resulting mixture was then refluxed under azeotropic condition for three hours to remove water of reaction. The resulting resinous product had the following properties:

Solids (percent) _____ 48–52.
Weight per gallon (pounds) _____ 8.07.
Viscosity (Gardner-Holdt) _____ V–Y.
Color (Gardner) _____ Under 7.
Acid value _____ 5.5 to 7.5.

*Example VIII*

The following materials were charged into a stainless steel bomb:

| | Parts by weight |
|---|---|
| Allyl alcohol | 282 |
| Styrene | 58 |
| Acrylonitrile | 46 |
| Ditertiary butyl peroxide | 6.0 |

The bomb was sealed and heated at 150° C. in an oil bath for 7½ hours. A viscous dark liquid was formed. The unreacted monomers were then removed by distillation under vacuum. One hundred thirty-two (132) parts by weight of interpolymer was obtained. The interpolymer contained 32.5 percent acrylonitrile, 48.5 percent styrene, 19.0 percent allyl alcohol, and had an OH value of 185.2.

*Example IX*

A styrene-allyl alcohol copolymer (Shell X–450) having an OH equivalent per 100 grams of 0.45 and a hydroxyl group content per mole of 5.2 was blended in an amount of 20 percent by weight with the amide interpolymer of Example VI. The solvents utilized were butanol and xylol and these were employed in an amount to give a spraying consistency of 25 seconds in a No. 4 Ford viscosity cup. Films of each composition were then Even further decrease in cure temperature can be obtained by adding external catalysts such as phosphoric acid or zinc chloride to the above compositions. For example, if 1 percent by weight of phosphoric acid is added to the blend of the amide interpolymer resin of Example VI with the allyl alcohol-styrene copolymer, the film is completely cured when baked at only 250° F. for 30 minutes.

*Example X*

The polymerization of Example VIII was repeated utilizing 460 parts by weight of allyl alcohol, 120 parts of styrene, 70 parts of acrylonitrile and 10.2 parts of ditertiary butyl peroxide. The polymerization was carried out at a temperature in a range of 148° C.–150° C. for 7½ hours. A very viscous liquid was obtained which became solid after being vacuum dried. The polymer contained 55.1 percent styrene, 25.4 percent acrylonitrile and 19.5 percent allyl alcohol.

*Example XI*

Ninety (90) parts by weight of the interpolymer of Example VI was admixed with 10 parts by weight of an epoxy resin (Epon 1001) in a solvent comprising a mixture of equal parts by weight of toluene and butanol. A sample of the resulting film was then drawn down on phosphated steel and the film baked for 30 minutes at 300° F. The film thus obtained was then rubbed 40 times with a cloth soaked in xylene. Softening of the film occurred, indicating that the film was not completely cured.

A second sample of the acrylamide interpolymer resin-epoxy resin blend (90 parts by weight) was admixed with 10 percent by weight on a resin solids basis of the hydroxyl-containing polymer of Example IX and a film of the resulting composition drawn out on phosphated steel and baked for 30 minutes at 300° F. The resulting film was then rubbed 40 times with a xylene-soaked cloth. No softening of the film occurred, this fact indicating that a substantially complete film cure had occurred.

*Example XII*

Ninety (90) parts by weight of the interpolymer of Example VI was admixed with 10 parts by weight of polyallyl alcohol (Shell X–101) and a film of the resulting composition drawn out on glass and baked for 30 minutes at 300° F. After being rubbed 40 times with a xylene-soaked cloth, only very slight softening of the surface occurred, indicating substantial cure of the film had taken place.

A similar composition, except that the polyallyl alcohol was omitted, was drawn out as a film on glass and baked for 30 minutes at 300° F. Substantial softening of the baked film occurred when it was rubbed 40 times with a xylene-soaked cloth, indicating the film had not been fully cured.

Example XIII

A composition was prepared comprising 90 parts by weight of the acrylamide interpolymer resin of Example VI and 10 parts by weight of an epoxide resin (Epon 1001) having an epoxide equivalent in the range of 450–525 and an average molecular weight of 900–1000. This resinous blend was diluted to a solids content of 50 percent in a mixture of equal parts of butanol and toluene.

Samples of the resinous composition thus prepared were admixed with varying amounts of a styrene-allyl alcohol copolymer (Shell X–450), formulated into a white enamel and the resulting compositions were sprayed onto phosphated steel panels with different panels being baked at temperatures of 300° F. for 30 minutes and 325° F. for 30 minutes. Control panels containing no styrene-allyl alcohol copolymer resins were also baked at 350° F. for 30 minutes.

The films thus obtained were then tested for pencil hardness, minutes required to soften the film in ethyl alcohol and xylene, the percent failure in a detergent bath, and stain resistance. The results are set forth in the following table:

| Weight parts blend of amide interpolymer with epoxide | Weight parts styrene-allyl alcohol copolymer | Cure temperature, °F. (30 minutes) | Pencil hardness | Minutes to soften film | | Percent failure in detergent | Stain resistance | | |
|---|---|---|---|---|---|---|---|---|---|
| | | | | Ethyl Alcohol | Xylene | | Ink | Mustard | Lipstick |
| 100 | | 350 | 4H | 15 | 15 | 5 | Light | Light | None. |
| 85 | 15 | 300 | 4H | 25 | 25 | 5 | None | None | Do. |
| 85 | 15 | 325 | 5H | 25 | 20 | 5 | ...do | ...do | Do. |
| 80 | 20 | 300 | 4H | 15 | 25 | 5 | ...do | ...do | Do. |
| 80 | 20 | 325 | 4H | 25 | 25 | 5 | ...do | ...do | Do. |
| 75 | 25 | 300 | 4H | 10 | 10 | 5 | ...do | ...do | Do. |
| 75 | 25 | 325 | 4H | 15 | 20 | 5 | ...do | ...do | Do. |

It can be seen from the foregoing table that the compositions containing both the amide interpolymer resin and a hydroxyl-containing polymer cure at temperatures of 300° F. and 325° F. to form films which are substantially equivalent, and in some instances even better than films of the amide interpolymer resin cured at 350° F. for an equal length of time.

Many modifications of the specific procedures set forth in the above examples can be made without substantially affecting the results obtained. For example, when polymers of aliphatic unsaturated alcohols are admixed with other of the amide interpolymer resins such as those described hereinabove, the curing temperature can be reduced by at least about 50° F. without adversely affecting the film properties. Also, polymers of other unsaturated alcohols than those disclosed above can be utilized in combination with the amide interpolymer resins with good results. Thus, for example, it is possible to substitute methallyl alcohol or allyl carbinol or the like for the allyl alcohol of the examples, with the results obtained being substantially the same as those described in the specific examples.

Although specific examples of the invention have been set forth hereinabove, it is not intended to limit the invention thereto, but to include all of the variations and modifications falling within the scope of the appended claims.

We claim:

1. A composition comprising a water-insoluble interpolymer of a polymerizable unsaturated carboxylic acid amide and at least one other monomer containing a $CH_2{=}C{<}$ group, said interpolymer being characterized by having amido hydrogen atoms replaced by the structure

wherein R is a member of the class consisting of hydrogen and hydrocarbon radicals, and $R_1$ is a member of the class consisting of hydrogen and alkyl radicals containing from about 1 to 8 carbon atoms, and a polymer of an aliphatic unsaturated alcohol.

2. A composition comprising a water-insoluble interpolymer of acrylamide and at least one other monomer containing a $CH_2{=}C{<}$ group, said interpolymer containing from about 2 percent to about 50 percent by weight of acrylamide in polymerized form based upon the total weight of said interpolymer, and being characterized by having amido hydrogen atoms replaced by the structure $-CH_2OR_1$, wherein $R_1$ is a member of the class consisting of hydrogen and alkyl radicals containing from about 1 to 8 carbon atoms, and a polymer of an aliphatic unsaturated alcohol.

3. The composition of claim 2 wherein the polymer of an unsaturated aliphatic alcohol is a polymer of a primary aliphatic unsaturated alcohol with at least one other $CH_2{=}C{<}$ monomer.

4. The composition of claim 3 wherein the copolymer is a copolymer of allyl alcohol and styrene.

5. The composition of claim 3 wherein the copolymer is a copolymer of allyl alcohol, styrene and acrylonitrile.

6. The composition of claim 4 wherein the interpolymer is an interpolymer of acrylamide, styrene, ethyl acrylate and a member of the class consisting of methacrylic acid and acrylic acid.

7. A composition comprising a mixture of a water-insoluble polymer of an unsaturated carboxylic acid amide and at least one other monomer containing a $CH_2{=}C{<}$ group, said polymer being characterized by having amido hydrogen atoms replaced by the structure

wherein R is a member of the class consisting of hydrogen and hydrocarbon radicals, and $R_1$ is a member of the class consisting of hydrogen and alkyl radicals containing from about 1 to 8 carbon atoms, and at least two other resinous materials, at least one of which is a polymer of an unsaturated aliphatic alcohol and another of which is a resin selected from the class consisting of epoxide resins, vinyl halide resins, amine resins, nitrocellulose, and hydrocarbon resins.

8. The composition of claim 7 wherein the amide interpolymer resin and the polymer of an unsaturated aliphatic alcohol are combined with an epoxide.

9. A composition comprising a mixture of a water-insoluble interpolymer of acrylamide with at least one other monomer containing a $CH_2{=}C{<}$ group, said interpolymer containing from about 2 percent to about 50 percent by weight of acrylamide in polymerized form based upon the total weight of said interploymer, and being characterized by having amido hydrogen atoms replaced by the structure $-CH_2OR_1$, wherein at least 50 percent of the $R_1$ groups are alkyl radicals containing from about 1 to about 8 carbon atoms and the remainder of the $R_1$ groups are hydrogen atoms, and at least two other resinous materials, one of which is a polymer of a primary unsaturated monohydric alcohol with at least one other $CH_2{=}C{<}$ monomer and another of which is a resinous material selected from the class consisting of epoxide resins, vinyl halide resins, amine resins, nitrocellulose, and hydrocarbon resins.

10. The composition of claim 9 wherein the copolymer is a copolymer of allyl alcohol and styrene, and the amide interpolymer resin and said copolymer are combined with an epoxide.

11. The composition of claim 10 wherein the interpolymer is an interpolymer of acrylamide, styrene, ethyl acrylate, and a member of the class consisting of methacrylic acid and acrylic acid.

References Cited in the file of this patent

UNITED STATES PATENTS

| | | |
|---|---|---|
| 2,173,005 | Strain | Sept. 12, 1939 |
| 2,420,730 | Woodward | May 20, 1947 |
| 2,808,383 | Fikentscher et al. | Oct. 1, 1957 |
| 2,817,651 | Chapin et al. | Dec. 24, 1957 |

FOREIGN PATENTS

| | | |
|---|---|---|
| 467,492 | Great Britain | June 11, 1937 |
| 578,345 | Canada | June 23, 1959 |

UNITED STATES PATENT OFFICE
CERTIFICATE OF CORRECTION

Patent No. 3,118,852 January 21, 1964

Roger M. Christenson et al.

It is hereby certified that error appears in the above numbered patent requiring correction and that the said Letters Patent should read as corrected below.

Column 12, line 69, before "50" insert -- about --.

Signed and sealed this 27th day of July 1965.

(SEAL)
Attest:

ERNEST W. SWIDER
Attesting Officer

EDWARD J. BRENNER
Commissioner of Patents